C. S. GILLILAND.
TIRE.
APPLICATION FILED JUNE 12, 1915.
1,173,949.
Patented Feb. 29, 1916.
2 SHEETS—SHEET 1.
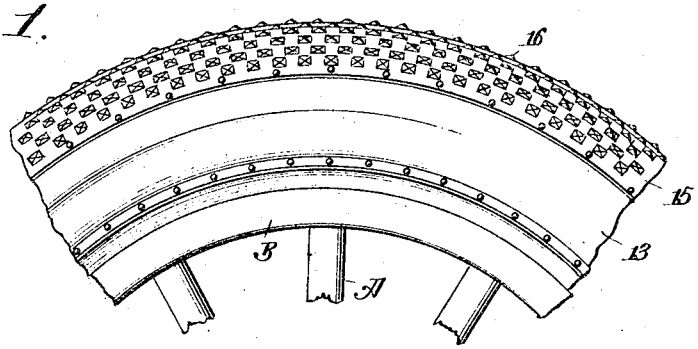
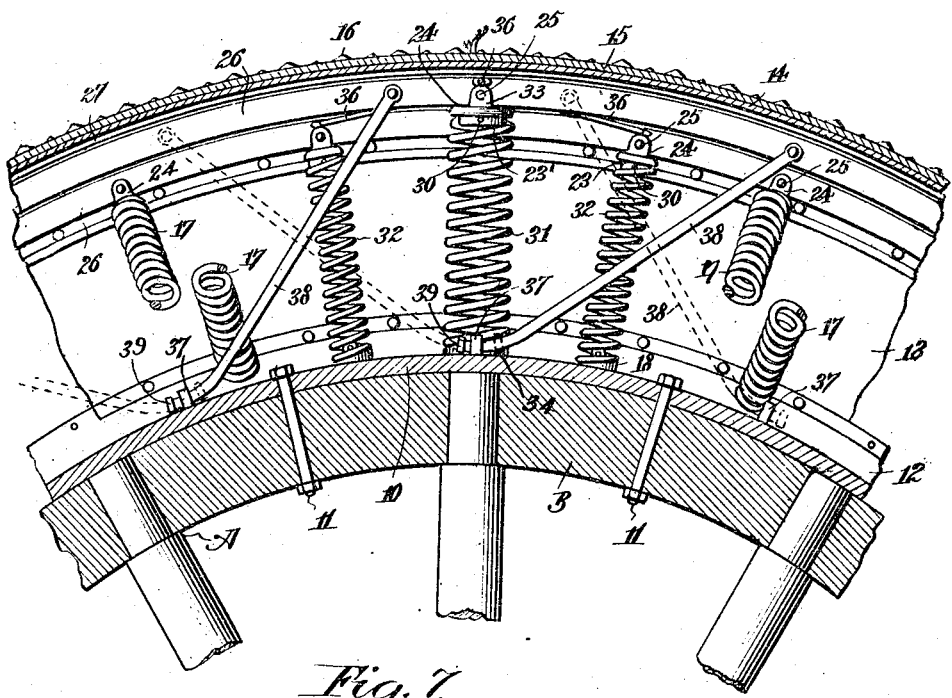
Witnesses:
Inventor,
C. S. Gilliland.
By Victor J. Evans,
Attorney.

C. S. GILLILAND.
TIRE.
APPLICATION FILED JUNE 12, 1915.
1,173,949.
Patented Feb. 29, 1916.
2 SHEETS—SHEET 2.
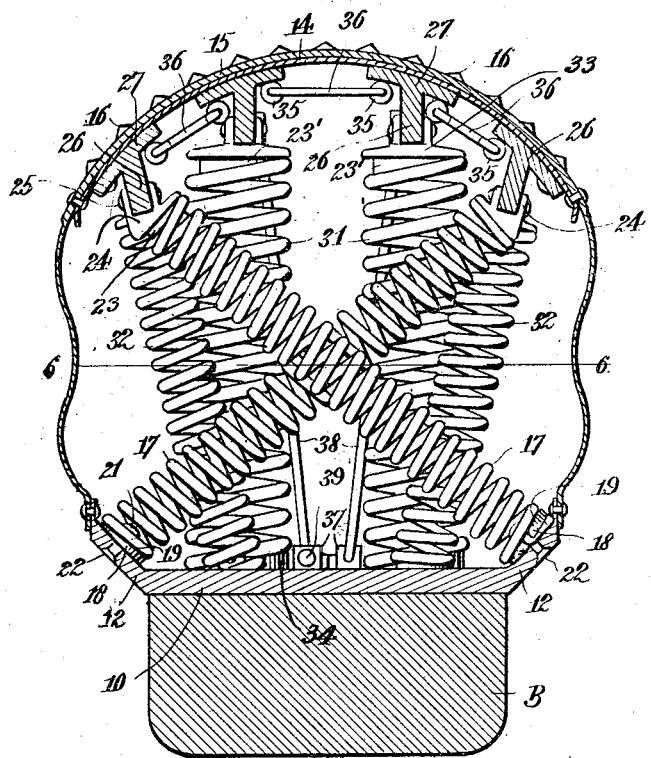
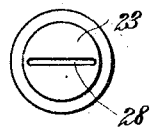
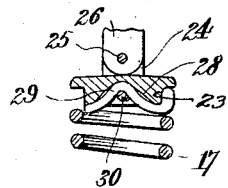
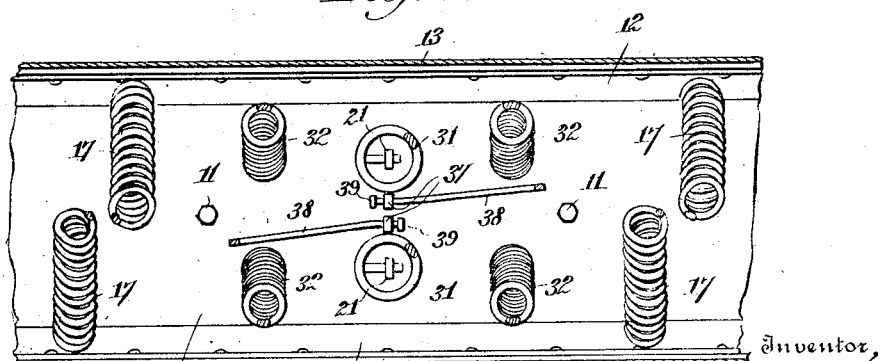
Witnesses:
C. Feinle Jr.
Inventor,
C. S. Gilliland.
By Victor J. Evans,
Attorney.

UNITED STATES PATENT OFFICE.

CHARLES S. GILLILAND, OF SPRINGFIELD, MISSOURI.

TIRE.

1,173,949.   Specification of Letters Patent.   Patented Feb. 29, 1916.

Application filed June 12, 1915. Serial No. 33,814.

*To all whom it may concern:*

Be it known that I, CHARLES S. GILLILAND, a citizen of the United States, residing at Springfield, in the county of Greene and State of Missouri, have invented new and useful Improvements in Tires, of which the following is a specification.

The invention relates to a tire, and more particularly to the class of spring tires for vehicle, automobile, motor-cycle, or the like wheels.

The primary object of the invention is the provision of a tire of this character wherein the inner pneumatic tube is entirely dispensed with, thereby eliminating the possibility of punctures and blow-outs, yet the tire possesses maximum resiliency to absorb shocks and jars incident to the travel thereof.

Another object of the invention is the provision of a tire of this character wherein the casing is sustained expanded under the action of springs which are mounted in a novel manner therein to assure the desired yieldability to the tire for the absorption of all shocks and jars to relieve the same from the vehicle while in motion.

A still further object of the invention is the provision of a tire of this character wherein the use of rubber is eliminated, thereby giving increased durability and strength thereto, and thus assuring longevity.

A still further object of the invention is the provision of a tire of this character which is simple in construction, thoroughly reliable and efficient in operation, and inexpensive in manufacture.

With these and other objects in view, the invention consists in the construction, combination and arrangement of parts as will be hereinafter fully described, illustrated in the accompanying drawings, and pointed out in the claims hereunto appended.

In the drawing: Figure 1 is a fragmentary side elevation of a vehicle wheel showing the tire constructed in accordance with the invention applied. Fig. 2 is a vertical longitudinal sectional view thereof. Fig. 3 is an enlarged vertical transverse sectional view. Fig. 4 is a plan view of one of the washers forming a seat for the spring. Fig. 5 is a sectional view thereof. Fig. 6 is a sectional view on the line 6—6 of Fig. 3. Fig. 7 is a perspective view of one of the springs.

Similar reference characters indicate corresponding parts throughout the several views in the drawings.

Referring to the drawings in detail, A designates a portion of a vehicle wheel having the usual felly B upon which is mounted the tire hereinafter fully described.

The tire comprises a channeled annulus 10 which is arranged concentrically about the felly B and is connected thereto through the medium of center bolts 11 which are passed through the annulus and also through the felly, while bolted to the divergent side flanges 12 of the annulus are the edges of a flexible casing 13, preferably made from soft leather, and having riveted or otherwise fixed at the tread portion thereof within the same an outwardly bowed reinforcing plate 14, the tread 15 of the casing being materially thickened with respect to the remaining portion thereof and carries upon the outer face thereof a plurality of substantially diamond-shaped headed rivets 16 forming an anti-skidding surface for the said casing.

Arranged within the casing 13 at intervals throughout the circumference thereof are diagonally disposed coiled compression springs 17 which are at right angles and cross each other at the center of the casing. Each spring 17 has one end engaging a bearing washer 18 formed with a seat 19 to receive the same, and this washer is fastened by means of a rivet 22 secured in the flanges 12 at opposite sides of the annulus, while the opposite end of each spring has its outermost coils engaged about a boss 23 on a pivot bearing 24 which is connected through the medium of a pivot 25 with the web 26 or a hoop 27 of T-shape in cross section which is fixed to the plate 14, the boss 23 being formed with a central slot 28 which receives the hook end 29 of the spring 17, and this hook end is engaged by a securing pin 30 passed transversely through the boss for the fastening of the end of the spring to the bearing.

Within the casing 13 and augmenting the springs 17 are the independent series of coiled compression springs 31 and 32, respectively, which have their outer ends fixed to the hanger bearings 33 having the bosses 23 in a manner similar to the fixing of the springs 17 to the bearings 24, while the inner ends are fixed to the annulus 10. It is of course understood that the required number of hoops 27 are fixed to the plate 14 concentrically about the tire. The springs 31 are of a larger size with respect to the springs 32 so that the resistance thereof is greater than the springs 32 for absorbing shocks and jars incident to the travel of the tire. Secured in the hoops 27 are eye members 35 in which are loosely connected coupling links 36 which flexibly unite the hoops to prevent the lateral separation thereof when subjected to shocks and jars imparted to the tire, yet the said casing 13 is freely flexible, while the springs absorb the shocks and jars.

Mounted at intervals centrally in the annulus 10 are guide eyes 37, while the hoops 27 have pivoted thereto anchor rods 38 which cross each other in pairs and are slidably engaged in the eyes 37, the free ends of the anchor rods 38 being formed with abutment heads 39 which limit the sliding movement of the said rods in the eyes in one direction, and these anchor rods prevent undue circumferential movement of the tire or the possibility of the twisting of the springs during the pulling action of the wheel.

What is claimed is:—

1. A tire of the class described comprising a channeled annulus adapted to be secured to the felly of a wheel, a flexible casing connected with the side flanges of the annulus and having a thickened tread, a reinforcing plate secured to the inner surface of the casing at the tread thereof, hoops fixed to the reinforcing plate and having hanger webs, washer bearings resting against the annulus, hanger bearings pivoted to the said hanger webs, and compression members connected with the said bearings and engaged with the washer bearings.

2. A tire of the class described comprising a channeled annulus adapted to be secured to the felly of a wheel, a flexible casing connected with the side flanges of the annulus and having a thickened tread, a reinforcing plate secured to the inner surface of the casing at the tread thereof, hoops fixed to the reinforcing plate and having hanger webs, washer bearings resting against the annulus, hanger bearings pivoted to the said hanger webs, compression members connected with the said bearings and engaged with the washer bearings, and links connecting the hoops to each other.

3. A tire of the class described comprising a channeled annulus adapted to be secured to the felly of a wheel, a flexible casing connected with the side flanges of the annulus and having a thickened tread, a reinforcing plate secured to the inner surface of the casing at the tread thereof, a plurality of hoops secured to the plate, hanger bearings pivoted to the hoops, and a plurality of coiled compression springs supported upon the annulus and engaged with the hanger bearings.

4. A tire of the class described comprising a channeled annulus adapted to be secured to the felly of a wheel, a flexible casing connected with the side flanges of the annulus and having a thickened tread, a reinforcing plate secured to the inner surface of the casing at the tread thereof, a plurality of hoops secured to the plate, hanger bearings pivoted to the hoops, a plurality of coiled compression springs supported upon the annulus and engaged with the hanger bearings, certain of said springs being arranged in diagonal relation and crossing each other at the center of the casing, and anchor members working in opposition to each other and connected with one of the hoops and to the annulus.

In testimony whereof I affix my signature in presence of two witnesses.

CHARLES S. GILLILAND.

Witnesses:
CHAS. C. CHAVERL,
W. D. CONN.